H. C. CHRISTIAN.
CONNECTING ROD.
APPLICATION FILED MAR. 8, 1920.
1,430,944. Patented Oct. 3, 1922.
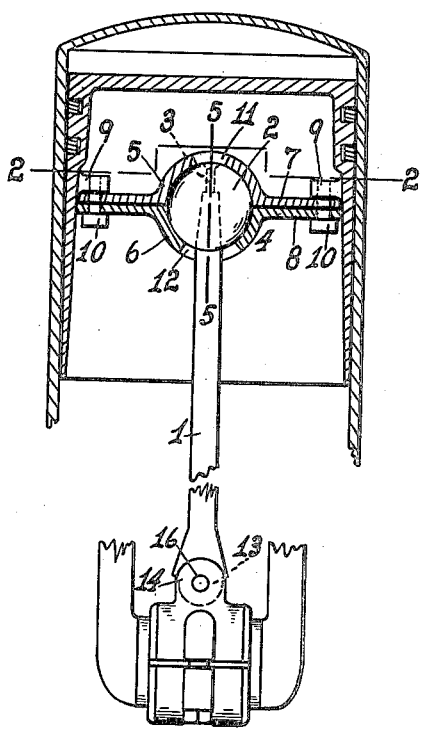
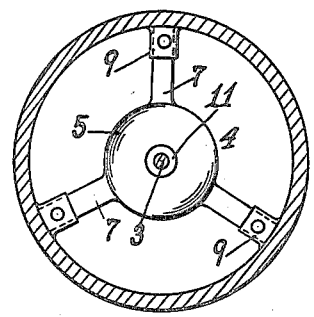
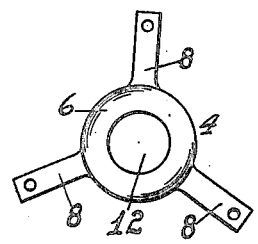
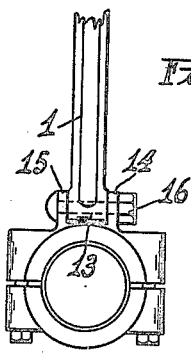
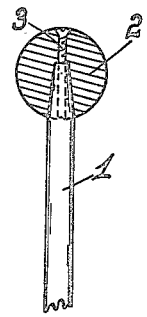
Inventor
Henry C. Christian.
By Harry C. Schroeder
Attorney Patented Oct. 3, 1922.

1,430,944

UNITED STATES PATENT OFFICE.

HENRY C. CHRISTIAN, OF OAKLAND, CALIFORNIA.

CONNECTING ROD.

Application filed March 8, 1920. Serial No. 363,922.

*To all whom it may concern:*

Be it known that I, HENRY C. CHRISTIAN, a citizen of the United States, residing at Oakland, in the county of Alameda and State of California, have invented certain new and useful Improvements in Connecting Rods, of which the following is a specification.

The present method of securing a connecting rod to the piston by means of a wrist pin requires great accuracy in construction. If the wrist pin bearings are not exactly diametrically opposite each other, the piston will bind against the cylinder and cause excessive wear. Again if the connecting rod bearing is not ground correctly a strain is imposed on the connecting rod.

The object of my invention is to provide means for maintaining the alignment of the piston and means for obviating the danger in incorrectly ground crank shaft bearings.

Figure 1 is a view partly in section of my connecting rod attached to a piston and crank shaft.

Figure 2 is a section on the line 2—2 of Figure 1.

Figure 3 is a bottom view of the lower socket member.

Figure 4 is a side view of the crank shaft bearing and coupling.

Figure 5 is a section on the line 5—5 of Figure 1.

Referring more particularly to the drawing, the numeral 1 indicates a connecting rod, the upper end of which is tapered to fit a hole in the ball 2. A countersunk screw 3 screws through the ball 2 and into the top of the connecting rod 1. A socket 4 fits over the ball 2. It comprises an upper socket member 5 and a lower socket member 6. The socket member 5 has a plurality of fastening arms 7, and the lower socket member 6 has a plurality of fastening arms 8. Lugs 9 on the inside of the piston register with the arms 7 and 8. Bolts 10 pass through the arms 7 and 8 and the lugs 9 which secures the socket to the piston. The upper socket member 5 has a central hole 11 which makes the screw 3 accessible, and also enables oil to circulate over the top of the ball 2. The lower socket member 6 has a hole 12, through which the connecting rod 1 passes, this is large enough to allow free movement to the rod. The lower end of the rod has a semi-circular bearing 13, which fits between the ears 14 and 15 on the upper half of the crank shaft bearing. A bolt 16 passes through the ears 14 and 15 and the bearing 13. If one side of the babbitt in the crank shaft bearing is thinner than the other the swivel allows the bearing to set on the crank shaft without straining the connecting rod.

Having described my invention, I claim:

1. In combination with a piston, a ball and socket joint connected to said piston, the ball of said joint having a tapered bore therein, the piston rod being tapered at its end to fit in said bore, and a screw extending into said ball and engaging the end of said piston rod.

2. In combination with a piston, an upper socket plate and a lower socket plate, a ball fitting between said socket plates, means for detachably securing said plates to the inside of said piston, said ball having a tapered bore extending therein from one side, the piston rod being tapered at one end to fit in said tapered bore, and a screw extending into said ball from the other side and engaging the tapered end of said piston rod, the upper socket plate having a central opening exposing the head of said screw.

In testimony whereof I affix my signature.

HENRY C. CHRISTIAN.